United States Patent
Nagai et al.

(10) Patent No.: US 6,655,225 B1
(45) Date of Patent: Dec. 2, 2003

(54) MOTOR-DRIVEN ACTUATOR

(75) Inventors: Shigekazu Nagai, Tokyo (JP); Akio Saitoh, Kawaguchi (JP); Masaki Miyahara, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/786,341

(22) PCT Filed: Sep. 9, 1999

(86) PCT No.: PCT/JP99/04887

§ 371 (c)(1),
(2), (4) Date: Mar. 9, 2001

(87) PCT Pub. No.: WO00/14431

PCT Pub. Date: Mar. 16, 2000

(30) Foreign Application Priority Data

Sep. 9, 1998 (JP) ............................. 10-255750

(51) Int. Cl.[7] ............................. F16H 29/20; F16H 1/26
(52) U.S. Cl. ...................................... 74/89.33; 74/89.36
(58) Field of Search .............................. 74/89.33, 89.36; 310/20, 80; 318/14

(56) References Cited

U.S. PATENT DOCUMENTS

| | | | | |
|---|---|---|---|---|
| 3,670,583 A | * | 6/1972 | Leming .................... | 74/441 |
| 4,702,493 A | * | 10/1987 | Escaravage ............... | 280/801.2 |
| 4,926,982 A | * | 5/1990 | Granbom .................. | 188/271 |
| 5,111,913 A | * | 5/1992 | Granbom .................. | 188/170 |
| 5,293,812 A | * | 3/1994 | Maki et al. ............... | 92/27 |
| 5,590,580 A | * | 1/1997 | Nagai ...................... | 74/424.82 |
| 5,637,940 A | * | 6/1997 | Nagai et al. .............. | 310/80 |
| 5,653,314 A | * | 8/1997 | Yamamoto et al. ......... | 188/67 |
| 5,747,896 A | * | 5/1998 | Nagai et al. .............. | 310/20 |
| 5,809,831 A | | 9/1998 | Nagai et al. .............. | 74/89.15 |
| 6,000,292 A | * | 12/1999 | Nagai et al. .............. | 277/634 |
| 6,346,788 B1 | * | 2/2002 | Nagai et al. .............. | 318/432 |

FOREIGN PATENT DOCUMENTS

| | | | |
|---|---|---|---|
| JP | 59137616 A | * | 8/1984 |
| JP | 61-73827 | | 5/1986 |
| JP | 439353 U | * | 4/1992 |
| JP | 624207 U | * | 3/1994 |
| WO | WO-9726461 A | * | 7/1997 |

OTHER PUBLICATIONS

Note: An abridged translation of relevant parts of the Japanese citation is attached. U.S. Pat. No. 5,809,831 corresponds in subject matter to Chinese Document No. 1149682.

* cited by examiner

Primary Examiner—Matthew C. Graham
Assistant Examiner—Melody M. Burch
(74) Attorney, Agent, or Firm—Paul A. Guss

(57) ABSTRACT

A load of a workpiece, which is applied to a slider (68), is supported by guide blocks (78) and guide rails (30*a*, 30*b*) provided for a frame (12). On the other hand, pin members (72), which constitute a floating mechanism (64) provided under the slider (68), are slidably engaged with fitting members (66) installed to recesses (62) of a projection (54). Therefore, a ball screw (16) is prevented from any application of the load of the workpiece via a displacement member (46).

17 Claims, 4 Drawing Sheets

MOTOR-DRIVEN ACTUATOR

BACKGROUND OF THE INVENTION

1. Field of the Invention

The present invention relates to an electric actuator which makes it possible to allow a displacement member to perform rectilinear motion by converting rotary motion of a feed screw into rectilinear motion by using a feed nut.

2. Description of the Related Art

An electric actuator, which is based on the use of a feed screw, has been hitherto used as a means for transporting a workpiece or the like. Such an electric actuator includes the feed screw which is arranged at the inside of a frame and which is connected to a rotary shaft of a motor. A feed nut, which is provided for a displacement member, is engaged with the feed screw. The displacement member is formed with a protruding section which protrudes to the outside through a slit formed for the frame. A slider is provided on the protruding section.

When the motor is driven, the feed screw is rotated. The rotary motion is converted by the feed nut into the rectilinear motion to displace the displacement member. The slider is displaced integrally with the displacement member, and thus the workpiece, which is placed on the slider, is transported.

However, in the case of the electric actuator concerning the conventional technique described above, the load caused by the weight of the workpiece is applied to the feed screw via the displacement member and the feed nut. Therefore, when a heavy matter is transported, the following inconvenience arises. That is, the feed screw is bent by the load, and any trouble occurs in the displacement action of the displacement member. Further, the abrasion amounts of the feed screw and the feed nut are increased. As a result, a problem arises such that the service life of the electric actuator is shortened.

An object of the present invention is to provide an electric actuator which makes it possible to avoid any application of a load of a workpiece to a feed screw and smoothly transport the workpiece composed of a heavy matter.

SUMMARY OF THE INVENTION

According to the present invention, the load, which is applied by a workpiece, is absorbed by a guide mechanism provided at the outside of a frame. A feed screw is prevented from any application of the load. Accordingly, no problem occurs, which would be otherwise caused, for example, such that the abrasion amounts of the feed screw and a feed nut are increased. It is possible to smoothly transport the workpiece composed of a heavy matter.

In the present invention, the guide mechanism is provided detachably with respect to the frame and a slider. Accordingly, a convenience is obtained such that the guide mechanism can be exchanged, if necessary, without disassembling an entire electric actuator.

Further, in the present invention, a floating mechanism is provided, which enables the slider to displace in a direction in which the load is applied to a projection. Accordingly, it is possible to reliably avoid any application of the load of the workpiece to the displacement member. Further, it is possible to avoid any occurrence of looseness in the slider, and it is possible to stably transport the workpiece.

DETAILED DESCRIPTION OF THE PREFERRED EMBODIMENTS

Figure 1:
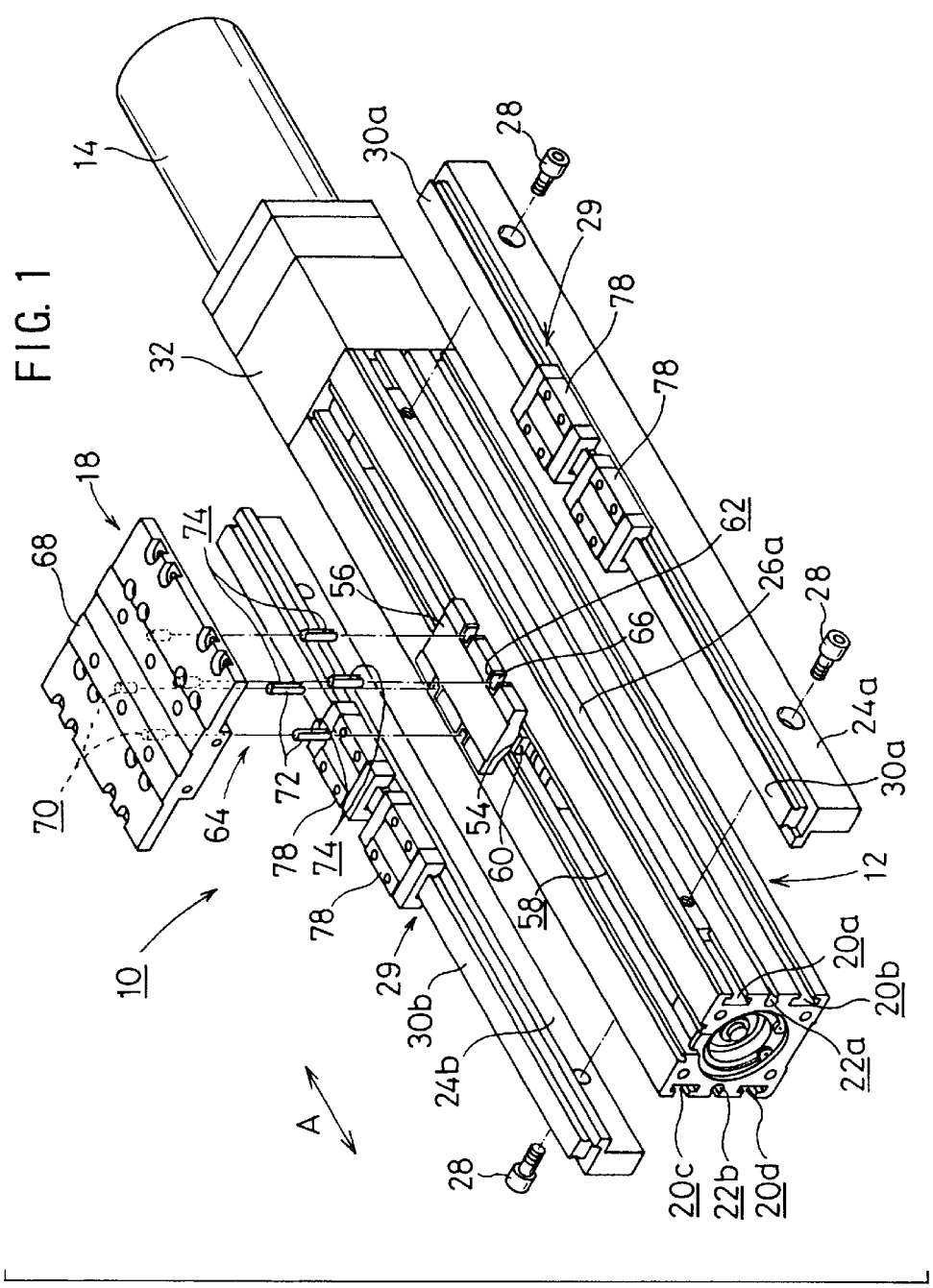
FIG. 1 shows an exploded perspective view illustrating an electric actuator according to an embodiment of the present invention.
Figure 2:
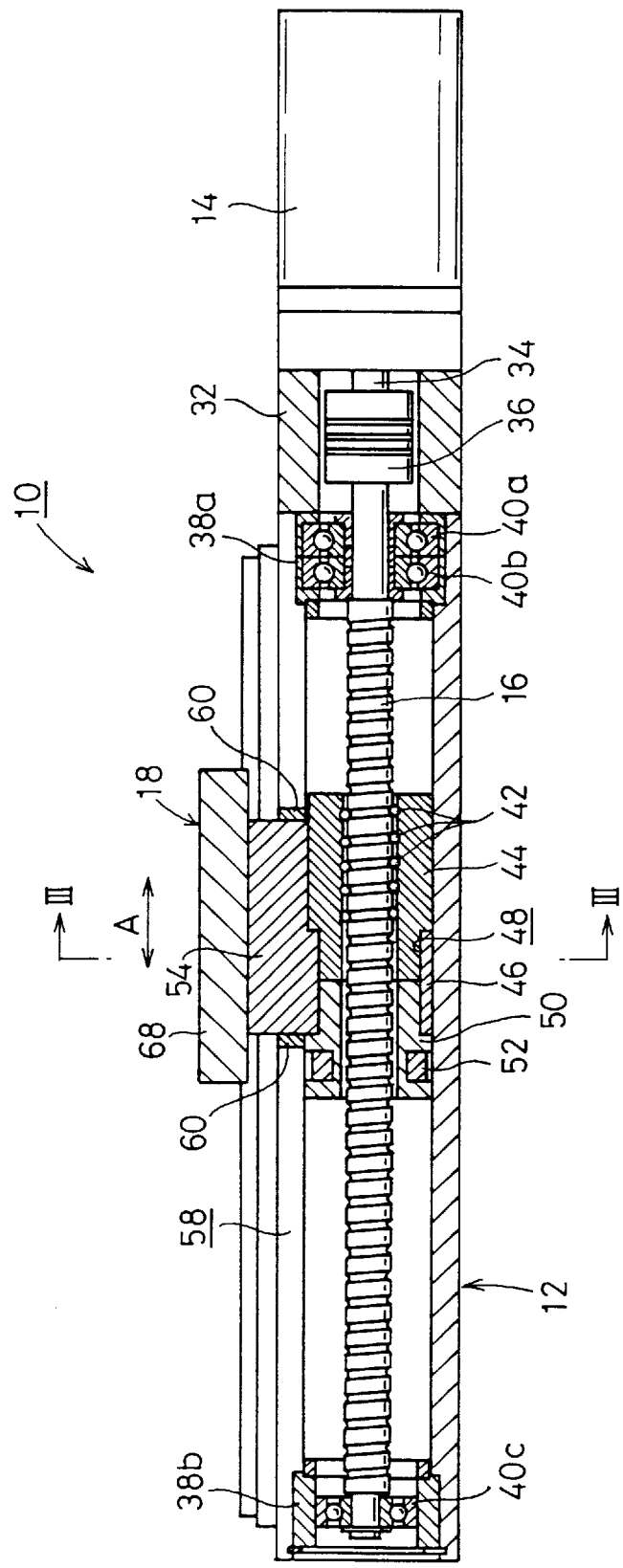
FIG. 2 shows a longitudinal sectional view taken in a displacement direction of the electric actuator shown in FIG. 1.

FIGS. 1 and 2, reference numeral 10 indicates an electric actuator according to an embodiment of the present invention. The electric actuator 10 basically comprises a frame 12 which is formed to have a lengthy size, a motor 14 which is provided on a first end side of the frame 12, a ball screw 16 which serves as a feed screw rotatably supported at the inside of the frame 12, and a displacement mechanism 18 which slidably contacts with the inner circumference of the frame 12 and which is displaceable by the aid of the ball screw 16.

Figure 3:
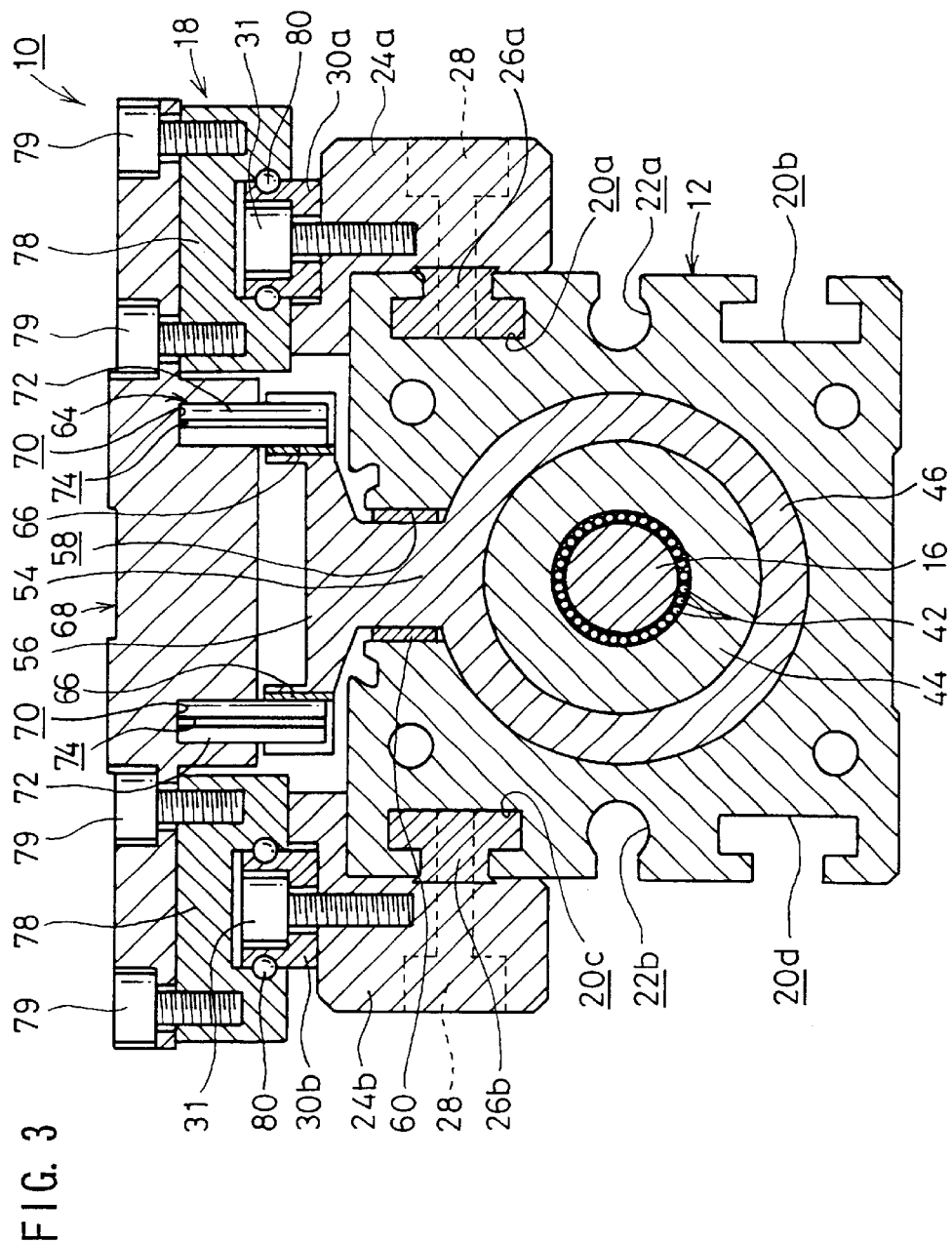
FIG. 3 shows a vertical sectional view taken along a line III—III shown in FIG. 2.

As shown in FIG. 3, a plurality of attachment long grooves 20a to 20d, each of which is formed to have a substantially T-shaped cross section, are formed substantially in parallel to one another in the longitudinal direction on mutually opposing outer wall surfaces of the frame. Sensor grooves 22a, 22b, to which an unillustrated position sensor is installed, are formed in the longitudinal direction between the attachment long groove 20a and the attachment long groove 20b and between the attachment long groove 20c and the attachment long groove 20d.

A pair of lengthy rail-shaped attachment members 24a, 24b are provided at upper corner portions of the frame 12, while being separated from each other by a predetermined spacing distance and being substantially parallel to one another respectively. Fitting member 26a, 26b, each of which is formed to have a substantially T-shaped cross section corresponding to the cross-sectional configuration of the attachment long groove 20a to 20d, are fastened by screws 28 to the attachment members 24a, 24b. In this arrangement, the fitting members 26a, 26b are fitted to the upper attachment long grooves 20a, 20c respectively, and thus the attachment members 24a, 24b are installed to corner portions of the frame 12 respectively. The attachment members 24a, 24b can be conveniently detached from the frame 12 by loosening the screws 28. Guide rails 30a, 30b, which constitute a guide mechanism 29, are secured by screws 31 to upper surfaces of the attachment members 24a, 24b.

A spacer 32, which is formed to have a box-shaped configuration, has its first end which is secured to the frame 12 (see FIG. 2). The motor 14 is secured to a second end of the spacer 32. The ball screw 16 is coaxially connected by a coupling 36 to a rotary shaft 34 of the motor 14. The ball screw 16 is rotatably supported by a pair of shaft support members 38a, 38b installed at the inside at both sides of the frame 12 by the aid of bearings 40a to 40c.

As shown in FIGS. 2 and 3, the displacement mechanism 18 is provided with a feed nut 44 which is engaged with the ball screw 16 by the aid of a ball bearing 42. The feed nut 44 is fitted to a first end side of a hole 48 of the displacement member 46 formed to have a substantially cylindrical configuration. A substantially cylindrical support member 50 is fitted to a second end side of the hole 48. A ring-shaped permanent magnet 52 is installed to the support member 50 by the aid of an annular groove. The unillustrated position sensor, which is provided at a predetermined portion of the sensor grooves 22a, 22b, senses the magnetic force of the permanent magnet 52 which is displaceable together with the displacement mechanism 18. Thus, it is possible to detect, for example, the displacement amount of the displacement mechanism 18.

A projection 54, which extends in the longitudinal direction of the frame 12, is integrally formed at an upper portion of the displacement member 46. A wide-width section 56 is formed at an upper portion of the projection 54 (see FIGS. 1 and 3). The projection 54 is provided to protrude outwardly by a predetermined length through a slit 58 which is defined at an upper portion of the frame 12. As shown in FIGS. 2 and 3, sliding members 60, which are provided slidably with respect to wall portions for forming the slit 58, are externally fitted to the projection 54.

As shown in FIG. 1, the wide-width section 56 is formed with a plurality of recesses 62. Fitting members 66, which constitute a floating mechanism 64, are internally fitted to the recesses 62. A slider 68 is provided on the upper side of the wide-width section 56. Recesses 70 are formed at bottom surface portions of the slider 68. Pin members (or sliding members) 72 are forcibly inserted into wall portions which constitute the recesses 70. The pin member 72 is formed of a material such as metal to have a substantially cylindrical configuration. A slit 74, which penetrates from one end to the other end in the longitudinal direction, is formed for the pin member 72. Accordingly, the pin member 72 is contractible in diameter by an amount corresponding to a width of the slit 74. However, in such a situation, the pin member 72 has resilient force to restore the original diameter. The pin member 72 is slidably fitted to the fitting member 66. Therefore, the slider 68 is provided displaceably with respect to the wide-width section 56 in the horizontal direction and the vertical direction substantially perpendicular to the displacement direction of the displacement mechanism 18. As shown in FIG. 3, the upper surface of the wide-width section 56 and the bottom surface of the slider 68 are set so that they are separated from each other by a predetermined spacing distance.

The recess 70 may be a hole penetrating through the slider 68. The pin members 72 may be secured to the wide-width section 56, and the pin members 72 may be slidably inserted into wall portions for constructing the recesses 70.

A plurality of guide blocks 78 are secured by screws 79 to both side portions of the lower surface of the slider 68. The guide blocks 78 are provided slidably along the guide rails 30a, 30b in accordance with the rolling action of a plurality of ball bearings 80.

The electric actuator 10 according to the embodiment of the present invention is basically constructed as described above. Next, its operation will be explained.

When the motor 14 is energized, and the rotary shaft 34 is rotated, then the ball screw 16 rotated in a predetermined direction by the aid of the coupling 36. The rotary motion is transmitted to the feed nut 44 by the aid of the plurality of ball bearings 42. In this situation, the sliding members 60 of the projection 54 are engaged with the wall portions of the slit 58. Therefore, the displacement mechanism 18 is prevented from rotation. Accordingly, the rotary motion is converted by the feed nut 44 into the rectilinear motion. The rectilinear motion is transmitted to the slider 68 by the aid of the pin members be 72. The slider 68 is displaced in the direction of the arrow A, and an unillustrated workpiece, which is placed on the slider 68, is transported.

During this process, a load (gravitational force) of the workpiece in the vertical direction (i.e., the direction of the gravitational force) is applied from the slider 68 to the guide blocks 78. Such a vertically directed load is supported by the guide blocks 78 and the guide rails 30a, 30b. In this arrangement, the pin members 72, which are installed to the lower portions of the slider 68, are provided to slide vertically with respect to the fitting members 66 of the wide-width section 56. Further, the slider 68 and the wide-width section 56 are separated from each other. Therefore, the load of the workpiece in the vertical direction is not transmitted from the pin members 72 to the wide-width section 56.

Accordingly, even when the workpiece is composed of a heavy matter, and the load applied to the slider 68 in the vertical direction is large, the load is not applied to the ball screw 16 via the displacement member 46 and the feed nut 44. There is also no fear of any trouble in the displacement action of the displacement member 46, which would be otherwise caused by any bending of the ball screw 16. Therefore, the electric actuator 10 can be used to transport the workpiece composed of a heavy matter. There is also no fear of any increase in abrasion amounts of the ball screw 16 and the feed nut 44, which would be otherwise caused by the load. It is possible to realize a long service life of the electric actuator 10.

In addition, when a load, which is substantially perpendicular to the movement direction and which is in a substantially horizontal direction to the movement direction, is applied to the slider 68, then the pin members 72 are slightly contracted in diameter by the amount of the spacing distance of the slit 74, and they move in a minute amount in the substantially horizontal direction with respect to the fitting members 66. Accordingly, horizontal loads may also be absorbed. Therefore, the displacement member 46 is reliably prevented from any transmission of horizontally directed loads. As a result, even when the load, which is substantially perpendicular to the movement direction and which is in the substantially horizontal direction, is applied to the slider 68, the load is not applied to the ball screw 16. No trouble occurs in the displacement action of the displacement member 46.

Further, the slider 68 is connected by the floating mechanism 64 (including pin member 72) which is displaceable in directions in which loads may be applied to the projection 54. Therefore, no looseness arises in the slider 68. It is possible to stably transport the workpiece.

In the case of the electric actuator 10, the guide mechanism 29 may be exchanged, if necessary. This procedure will be explained in detail below. The guide rails 30a, 30b are detached from the frame 12 by detaching the attachment members 24a, 24b from the frame 12 by loosening the screws 28. On the other hand, the guide blocks 78 are detached from the slider 68 by loosening the screws 79. For example, when a workpiece having a larger weight is transported, although not shown, a guide mechanism having a large durable load such as a guide mechanism provided with a needle bearing and a slide guide mechanism is installed to the frame 12 and the slider 68 by the aid of the screws 28, 79.

In the case of an unillustrated electric actuator concerning the conventional technique, a guide mechanism is provided at the inside of a frame. Therefore, it is necessary to disassemble the electric actuator to exchange the guide mechanism, which is complicated. On the contrary, the embodiment of the present invention has the following advantage. That is, when the guide mechanism 29 is exchanged the guide mechanism 29 can be easily exchanged without disassembling the electric actuator 10.

Figure 4:
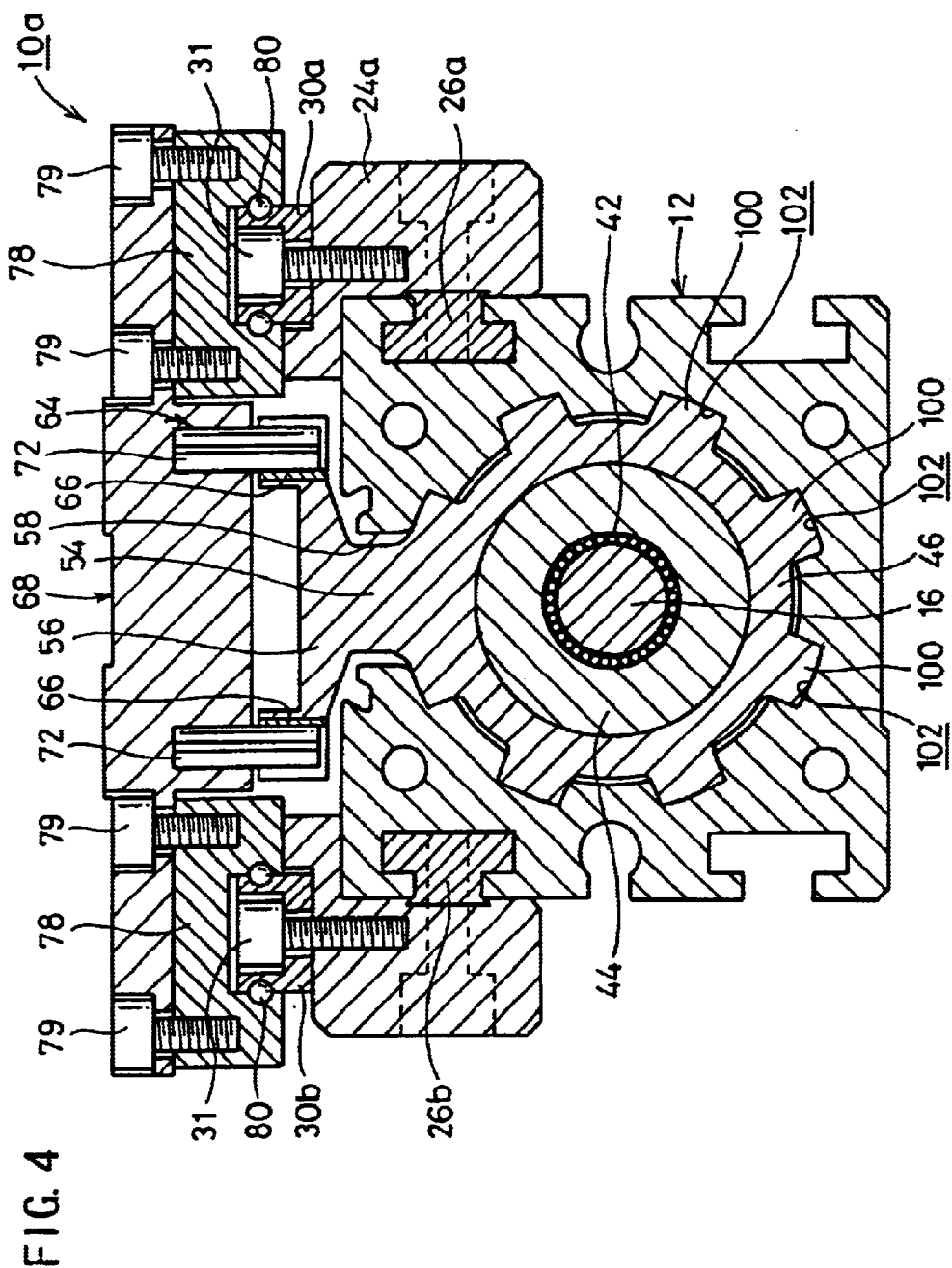
FIG. 4 shows a vertical sectional view illustrating an electric actuator according to another embodiment of the present invention.

As described above, in the embodiment of the present invention, the rotation of the displacement mechanism 18 is prohibited by engaging the sliding members 60 of the projection 54 with the wall portions of the slit 58. Alternatively, as shown in FIG. 4, the following arrangement also available. That is, a plurality of expansions 100, which extend in the displacement direction of the displacement member 46 and which are separated from each other by predetermined angles along the circumferential direction, are formed on the outer circumferential surface of the displacement member 46. The expansions 100 are slidably engaged with a plurality of grooves 102 which are formed on the inner circumference of the frame 12 so that the rotation of the displacement mechanism 18 is prohibited. The cross-sectional configuration of each of the expansions 100 and the grooves 102 may be, for example, any one of angular configurations, circular configurations (including, for example, semicircular configurations, elliptic configurations, and composite curves), and involute configurations. When the involute configuration is used, an automatic core-adjusting function is provided.

The feed screw is not limited to the ball screw 16. It is also preferable to use an unillustrated slide screw.

According to the present invention, the load, which is applied by the workpiece, is supported by the guide mechanism provided at the outside of the frame. Further, the slider is connected to the projection of the displacement member by the aid of the floating mechanism. Therefore, the feed screw is prevented from any application of the load. Even when the load of the workpiece is large, there is no fear to cause any trouble in the displacement action of the displacement member, which would be otherwise caused by the bending of the feed screw. Further, the abrasion amounts of the feed nut and the feed screw are not increased. Therefore, the electric actuator can be used to smoothly transport the workpiece composed of a heavy matter.

The type of the guide mechanism can be exchanged, if necessary. For example, when a larger workpiece is transported, the guide mechanism having large load resistance may be installed to the electric actuator. The electric actuator can be used for a variety of ways of use. The versatility of the electric actuator is improved.

What is claimed is:

1. An electric actuator comprising:

a frame;

a rotary driving source arranged on said frame;

a feed screw for transmitting a rotary driving force of said rotary driving source;

a feed nut engaged with said feed screw, for converting rotary motion of said feed screw into rectilinear motion;

a displacement member connected to said feed nut, or making displacement in an axial direction of said frame;

a projection provided for said displacement member and protruding to the outside through a slit formed in said frame;

a slider installed on said projection;

a guide mechanism provided at the outside of said frame, for guiding said slider, wherein said guide mechanism includes a guide rail installed on the outside of said frame and extending in a displacement direction of said displacement member, and a guide block installed on said slider, for making slidable engagement with said guide rail, and wherein said guide rail is detachably installed on said frame by the aid of a long groove formed in a longitudinal direction on an outer wall surface of said frame;

an attachment member for supporting said guide rail;

a fitting member for being fitted into said long groove formed on said outer wall surface of said frame; and a screw member for fixing said attachment member to said fitting member, wherein a load applied to said slider is supported by said guide mechanism, wherein said slider is connected to said projection through a floating mechanism, which enables said slider to be displaceable toward the feed screw in a direction normal to an axial direction of said feed screw when said load is applied to said slider, and wherein said floating mechanism includes a sliding member installed to one of a bottom surface portion of said slider and an upper surface portion of said projection, and said sliding member is provided slidably in a recess formed on one of said upper surface portion of said projection and said bottom surface portion of said slider.

2. The electric actuator according to claim 1, wherein said guide mechanism is provided detachably with respect to said frame and said slider.

3. An electric actuator comprising:

a frame;

a rotary driving source arranged on said frame;

a feed screw for transmitting a rotary driving force of said rotary driving source;

a feed nut engaged with said feed screw, for converting rotary motion of said feed screw into rectilinear motion;

a displacement member connected to said feed nut, for making displacement in an axial direction of said frame;

a projection provided for said displacement member and protruding to the outside through a slit formed in said frame;

a slider installed to said projection; and a guide mechanism provided at the outside of said frame, wherein a load applied to said slider is supported by said guide mechanism, wherein said slider is connected to said projection through a floating mechanism, which enables said slider to be displaceable toward the feed screw in a direction normal to an axial direction of said feed screw when said load is applied to said slider, and wherein said floating mechanism includes a pin member installed on a bottom surface portion of said slider, and said pin member is provided slidably in a recess formed on said projection.

4. An electric actuator comprising:

a frame;

a rotary driving source arranged on said frame;

a feed screw for transmitting a rotary driving force of said rotary driving source;

a feed nut engaged with said feed screw, for converting rotary motion of said feed screw into rectilinear motion;

a displacement member connected to said feed nut, for making displacement in an axial direction of said frame;

a projection provided for said displacement member and protruding to the outside through a slit formed in said frame;

a slider installed to said projection; and a guide mechanism provided at the outside of said frame, wherein a load applied to said slider is supported by said guide mechanism, wherein said slider is connected to said projection through a floating mechanism, which enables said slider to be displaceable toward the feed screw in a direction normal to an axial direction of said feed screw when said load is applied to said slider, and wherein said floating mechanism includes a pin member installed on an upper surface portion of said projection, and said pin member is provided slidably in a recess formed on a bottom surface portion of said slider.

5. The electric actuator according to claim 3, wherein said pin member is formed of a metal material having a hollow and substantially cylindrical configuration, and further comprises a slit formed in said pin member extending from one end to the other end in a longitudinal direction of said pin member.

6. The electric actuator according to claim 4, wherein said pin member is formed of a metal material having a hollow and substantially cylindrical configuration, and further comprises a slit formed in said pin member extending from one end to the other end in a longitudinal direction of said pin member.

7. The electric actuator according to claim 1, wherein an expansion, which is slidable with respect to a groove formed on an inner circumferential surface of said frame, is provided on an outer circumferential surface of said displacement member.

8. The electric actuator according to claim 3, wherein said guide mechanism is provided detachably with respect to said frame and said slider.

9. The electric actuator according to claim 3, wherein said guide mechanism includes: a guide rail installed on the outside of said frame and extending in a displacement direction of said displacement member; and a guide block installed on said slider, for making slidable engagement with said guide rail.

10. The electric actuator according to claim 9, wherein said guide rail is detachably installed on said frame by the aid of a long groove formed in a longitudinal direction on an outer wall surface of said frame.

11. The electric actuator according to claim 10, further comprising:

an attachment member for supporting said guide rail;

a fitting member for being fitted into said long groove formed on said outer wall surface of said frame; and a screw member for fixing said attachment member to said fitting member.

12. The electric actuator according to claim 3, wherein an expansion, which is slidable with respect to a groove formed on an inner circumferential surface of said frame, is provided on an outer circumferential surface of said displacement member.

13. The electric actuator according to claim 4, wherein said guide mechanism is provided detachably with respect to said frame and said slider.

14. The electric actuator according to claim 4, wherein said guide mechanism includes:

a guide rail installed on the outside of said frame and extending in a displacement direction of said displacement member; and a guide block installed on said slider, for making slidable engagement with said guide rail.

15. The electric actuator according to claim 14, wherein said guide rail is detachably installed on said frame by the aid of a long groove formed in a longitudinal direction on an outer wall surface of said frame.

16. The electric actuator according to claim 15, further comprising:

an attachment member for supporting said guide rail;

a fitting member for being fitted into said long groove formed on said outer wall surface of said frame; and a screw member for fixing said attachment member to said fitting member.

17. The electric actuator according to claim 4, wherein an expansion, which is slidable with respect to a groove formed on an inner circumferential surface of said frame, is provided on an outer circumferential surface of said displacement member.

* * * * *